United States Patent
Amarilio et al.

(10) Patent No.: US 10,511,397 B2
(45) Date of Patent: Dec. 17, 2019

(54) VIRTUAL GENERAL PURPOSE INPUT/OUTPUT (GPIO) (VGI) OVER A TIME DIVISION MULTIPLEX (TDM) BUS

(71) Applicant: QUALCOMM Incorporated, San Diego, CA (US)

(72) Inventors: Lior Amarilio, Yokneam (IL); Sharon Graif, Zichron Yaakov (IL); Lalan Jee Mishra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 15/878,790

(22) Filed: Jan. 24, 2018

(65) Prior Publication Data

US 2019/0229824 A1 Jul. 25, 2019

(51) Int. Cl.
| | |
|---|---|
| *H04J 3/02* | (2006.01) |
| *G06F 3/16* | (2006.01) |
| *G06F 13/42* | (2006.01) |
| *H04L 12/40* | (2006.01) |
| *H04B 1/38* | (2015.01) |

(52) U.S. Cl.
CPC ............... *H04J 3/02* (2013.01); *G06F 3/162* (2013.01); *G06F 13/4291* (2013.01); *H04B 1/38* (2013.01); *H04L 12/40* (2013.01)

(58) Field of Classification Search
CPC . H04J 3/02; G06F 3/162; H04L 12/40; H04B 1/38
See application file for complete search history.

(56) References Cited

U.S. PATENT DOCUMENTS

| | | | | |
|---|---|---|---|---|
| 3,927,269 | A | * 12/1975 | Yoshino | H04J 3/1605 348/24 |
| 8,374,046 | B2 | * 2/2013 | Tu | G06F 21/79 365/189.05 |
| 9,436,633 | B2 | 9/2016 | Segev et al. | |
| 9,578,676 | B2 | 2/2017 | Zheng et al. | |
| 2008/0062897 | A1 | * 3/2008 | Loffink | H04L 5/1492 370/294 |
| 2011/0154377 | A1 | * 6/2011 | Upton | G06F 9/45533 719/328 |
| 2012/0224613 | A1 | 9/2012 | Loh | |
| 2013/0322461 | A1 | * 12/2013 | Poulsen | H04J 3/02 370/458 |
| 2015/0220475 | A1 | 8/2015 | Amarilio et al. | |

(Continued)

OTHER PUBLICATIONS

International Search Report and Written Opinion for PCT/US2019/014818, dated Mar. 21, 2019, 12 pages.

*Primary Examiner* — Mohammad S Anwar
(74) *Attorney, Agent, or Firm* — Withrow & Terranova, PLLC

(57) ABSTRACT

Systems and methods for providing virtual general purpose input/output (GPIO) (VGI) over a time division multiplex (TDM) bus are disclosed. While a SOUNDWIRE bus is particularly contemplated, other TDM buses may also be used to provide the benefits outlined herein. In particular, raw GPIO signals are placed into time slots on a TDM bus without requiring additional overhead or packaging. This arrangement allows all drops on a multi-drop bus to receive the GPIO signals substantially concurrently with latency measured in less than a frame period.

24 Claims, 7 Drawing Sheets

(56) References Cited

U.S. PATENT DOCUMENTS

2015/0371690 A1* 12/2015 Amarilio .............. G11C 7/1075
                                                        710/316
2017/0075852 A1   3/2017  Mishra et al.
2017/0078213 A1   3/2017  May et al.
2017/0168966 A1*  6/2017  Mishra ................... H04W 4/80
2017/0181031 A1   6/2017  Hazani et al.

* cited by examiner

VIRTUAL GENERAL PURPOSE INPUT/OUTPUT (GPIO) (VGI) OVER A TIME DIVISION MULTIPLEX (TDM) BUS

BACKGROUND

I. Field of the Disclosure

The technology of the disclosure relates generally to ways and techniques to send general purpose input/output (GPIO) signals through a virtual channel.

II. Background

Computing devices have become increasingly common in current society. Computing devices have evolved from large cumbersome devices with limited functionality into small, portable multi-function, multimedia devices. These myriad functions are enabled by integrated circuits (ICs) within the computing devices. In general, there has been substantial pressure to make the ICs smaller and faster.

Typically, a computing device may incorporate multiple ICs that communicate with one another to effectuate various functions. Various protocols and communication buses have evolved to allow the ICs to communicate with one another. In many instances these protocols and communication buses are tailored to particular functions that are being enabled by the protocols or buses. In other instances, such communication may fall outside a protocol, but still need to be conveyed between ICs. One technique to allow such communication to pass is referred to as general purpose input/output (GPIO). GPIO signals typically require a pin or bump to be present on the IC to couple to a conductive trace to carry the signal between ICs. Such pins or bumps are, in relative terms, expensive both from a material cost as well as consuming area on the ICs. Such pins may also require additional circuitry (with its own added expense and area penalty) within the ICs to send and receive signals through the pin or bump.

In general, such added expense and added area consumption are considered undesirable for most ICs. Accordingly, various efforts have been made to send GPIO signals over pre-existing pins. Such efforts are sometimes referred to as Virtual GPIO (VGI). At the time of this writing, such efforts have been directed to protocols and communication schemes such as system power management interface (SPMI) and Improved Inter Integrated Circuit (I3C). While effective at reducing pin requirements and consolidating circuitry, such efforts require overhead to package the messages in a format acceptable to such buses and the corresponding routing within the ICs. Accordingly, there is a need to find better ways to effectuate VGI.

SUMMARY OF THE DISCLOSURE

Aspects disclosed in the detailed description include systems and methods for providing virtual general purpose input/output (GPIO) (VGI) over a time division multiplex (TDM) bus. While a SOUNDWIRE bus is particularly contemplated, other TDM buses may also be used to provide the benefits outlined herein. In particular, raw GPIO signals are placed into time slots on a TDM bus without requiring additional overhead or packaging. This arrangement allows all drops on a multi-drop bus to receive the GPIO signals substantially concurrently with latency measured in less than a frame period.

In this regard in one aspect, an integrated circuit (IC) is disclosed. The IC includes a bus interface configured to couple to a TDM bus. The IC also includes a transceiver coupled to the bus interface and configured to send signals and receive signals over the TDM bus through the bus interface. The IC also includes a logic element coupled to the transceiver and providing to the transceiver at least one GPIO signal. The IC also includes a control system. The control system is configured to cause the transceiver to send the at least one GPIO signal in a first TDM slot over the TDM bus.

In another aspect, an IC is disclosed. The IC includes a bus interface configured to couple to a TDM bus. The IC also includes a transceiver coupled to the bus interface and configured to send signals and receive signals over the TDM bus through the bus interface. The IC also includes a logic element coupled to the transceiver and receiving from the transceiver at least one GPIO signal. The IC also includes a control system. The control system is configured to cause the transceiver to receive the at least one GPIO signal in a first TDM slot over the TDM bus.

In another aspect, a method of sending a GPIO signal over a bus is disclosed. The method includes placing a raw GPIO signal within a TDM slot in a TDM frame. The method also includes sending from a first IC the TDM frame over a TDM bus to a second IC.

In another aspect, a method of sending a GPIO signal over a bus is disclosed. The method includes receiving at a first IC a TDM signal including one or more TDM slots. The method also includes extracting from one of the one or more TDM slots a raw GPIO signal.

DETAILED DESCRIPTION

Figure 1:
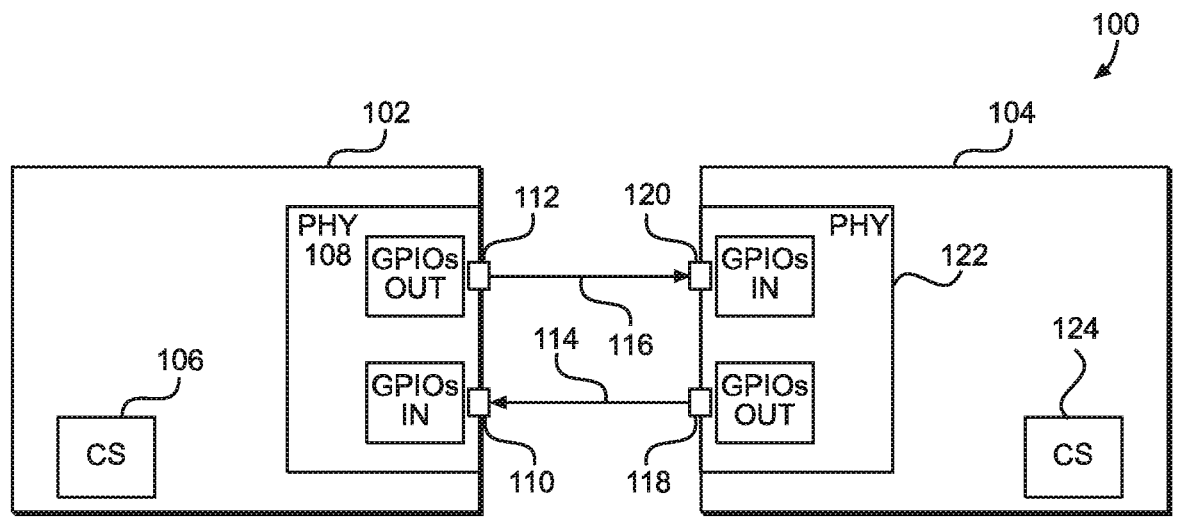
FIG. 1 is a block diagram of a conventional arrangement of two integrated circuits (ICs) with bidirectional general purpose input/output (GPIO) connections therebetween.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include systems and methods for providing virtual general purpose input/output (GPIO) (VGI) over a time division multiplex (TDM) bus. While a SOUNDWIRE bus is particularly contemplated, other TDM buses may also be used to provide the benefits outlined herein. In particular, raw GPIO signals are placed into time slots on a TDM bus without requiring additional overhead or packaging. This arrangement allows all drops on a multi-drop bus to receive the GPIO signals substantially concurrently with latency measured in less than a frame period.

Before addressing exemplary aspects of the present disclosure, a brief overview of a conventional GPIO communication system is provided with reference to FIG. 1. A discussion of exemplary aspects of the present disclosure begins below with reference to FIG. 2.

In this regard, FIG. 1 is a block diagram of a computing system 100 having a first integrated circuit (IC) 102 and a second IC 104. The first IC 102 includes a control system 106 (referred to in the drawings as CS) that generates information and/or uses information that is received. The first IC 102 further includes a physical layer (PHY) 108 coupled to a first input pin 110 and a first output pin 112. While not explicitly illustrated, the PHY 108 includes necessary and sufficient structure to act as a transceiver to send and receive signals through the first input pin 110 and the first output pin 112. In this regard, the PHY 108 may sometimes be referred to as a bus interface. The first input pin 110 is coupled to a first conductive trace 114 that may be on a printed circuit board or other support structure. Similarly, the first output pin 112 is coupled to a second conductive trace 116 that may also be on a printed circuit board or the like. The first conductive trace 114 is also coupled to a second output pin 118 on the second IC 104 while the second conductive trace 116 is coupled to a second input pin 120 on the second IC 104. The second IC 104 further includes a PHY 122 similar to the PHY 108. The second IC 104 further includes a second control system 124. The second control system 124 likewise generates information and/or uses information that is received. In use, the control systems 106 and 124 communicate through the PHYs 108 and 122 using a GPIO protocol. This use makes the pins 110, 112, 118, and 120 GPIO pins. Thus, to achieve bidirectional communication, four pins are required along with the associated conductive traces 114 and 116. The presence of the pins 110, 112, 118, and 120 add to the expense of the first IC 102 and the second IC 104 as well as make the first IC 102 and the second IC 104 larger and more complex by virtue of the presence of the PHYs 108 and 122.

Exemplary aspects of the present disclosure allow for VGI, which helps reduce the need for dedicated GPIO pins. Further, by placing the VGI in a TDM bus using a TDM protocol, the information that would normally be sent through a GPIO pin is concurrently available to multiple ICs with minimal latency and no additional overhead.

Figure 2:
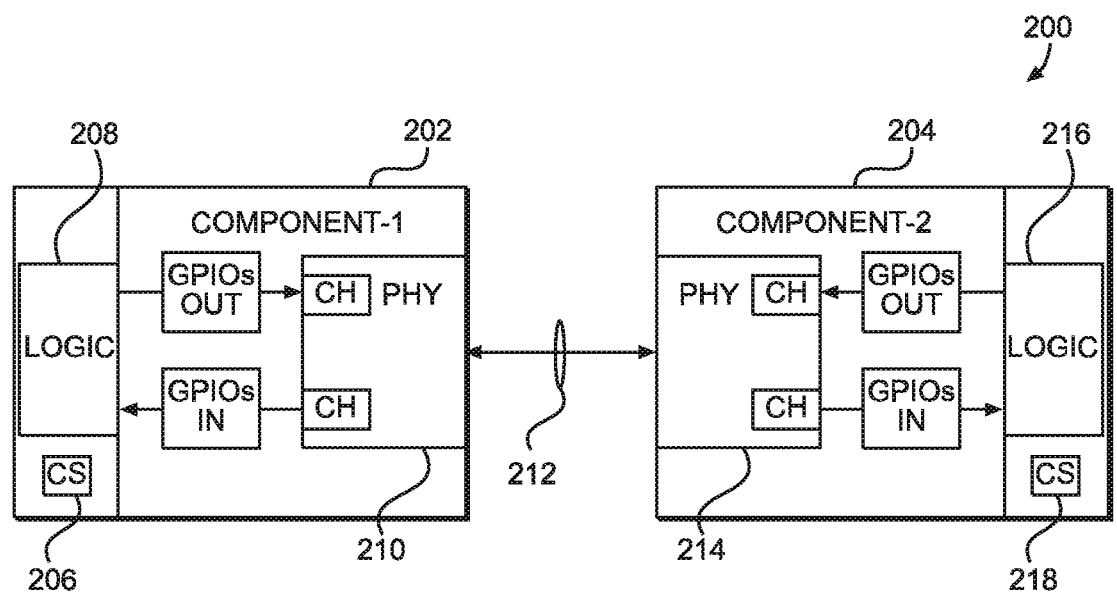
FIG. 2 is a block diagram of an arrangement of two ICs with a virtual GPIO (VGI) connection allowing bidirectional communication according to an exemplary aspect of the present disclosure.

In this regard, FIG. 2 provides a block diagram of a computing system 200 having a first IC 202 and a second IC 204. The first IC 202 includes a control system 206 and a logic element 208 that sends and/or receives GPIO signals from a TDM bus PHY 210. The TDM bus PHY 210 converts GPIO OUT signals by placing them into channels within a TDM stream for transmission over a TDM bus 212. The TDM bus PHY 210 also extracts GPIO IN signals that are within channels on the TDM bus 212. The GPIO IN signals are passed to the logic element 208. Again, while not explicitly illustrated, the TDM bus PHY 210 includes necessary and sufficient structure to act as a transceiver to send and receive signals over the TDM bus 212. Thus, the TDM bus PHY 210 may likewise sometimes be referred to as a bus interface. The second IC 204 is also coupled to the TDM bus 212, through a second PHY 214 that handles TDM slots in similar fashion. The second PHY 214 receives GPIO OUT signals from a logic element 216 and sends GPIO IN signals to the logic element 216. Likewise a control system 218 may further control the operation of the second IC 204.

With continued reference to FIG. 2, as illustrated, the first IC 202 may be a master relative to the TDM bus 212 and the second IC 204 may be a slave relative to the TDM bus 212. In a master/slave arrangement, the control system 206 of the first IC 202 may designate into which TDM slots which channels are assigned and provide a clock signal (not illustrated) to the TDM bus 212 to allow the second IC 204 to synchronize to the TDM bus 212. Where there is not a master/slave arrangement between the first IC 202 and the second IC 204, there may be other rules that allow the TDM slots to be assigned.

By placing the GPIO signals into TDM slots, there is no need for additional overhead and there is no need for dedicated GPIO pins and the GPIO PHYs. Further, signals sent across the TDM bus 212 arrive with relatively little latency. As used herein, "little latency" may also be referred to within the industry as "short latency." The latency benefits are more pronounced in a multi-drop bus, as explained in greater detail below with reference to FIGS. 3 and 4.

Figure 3:
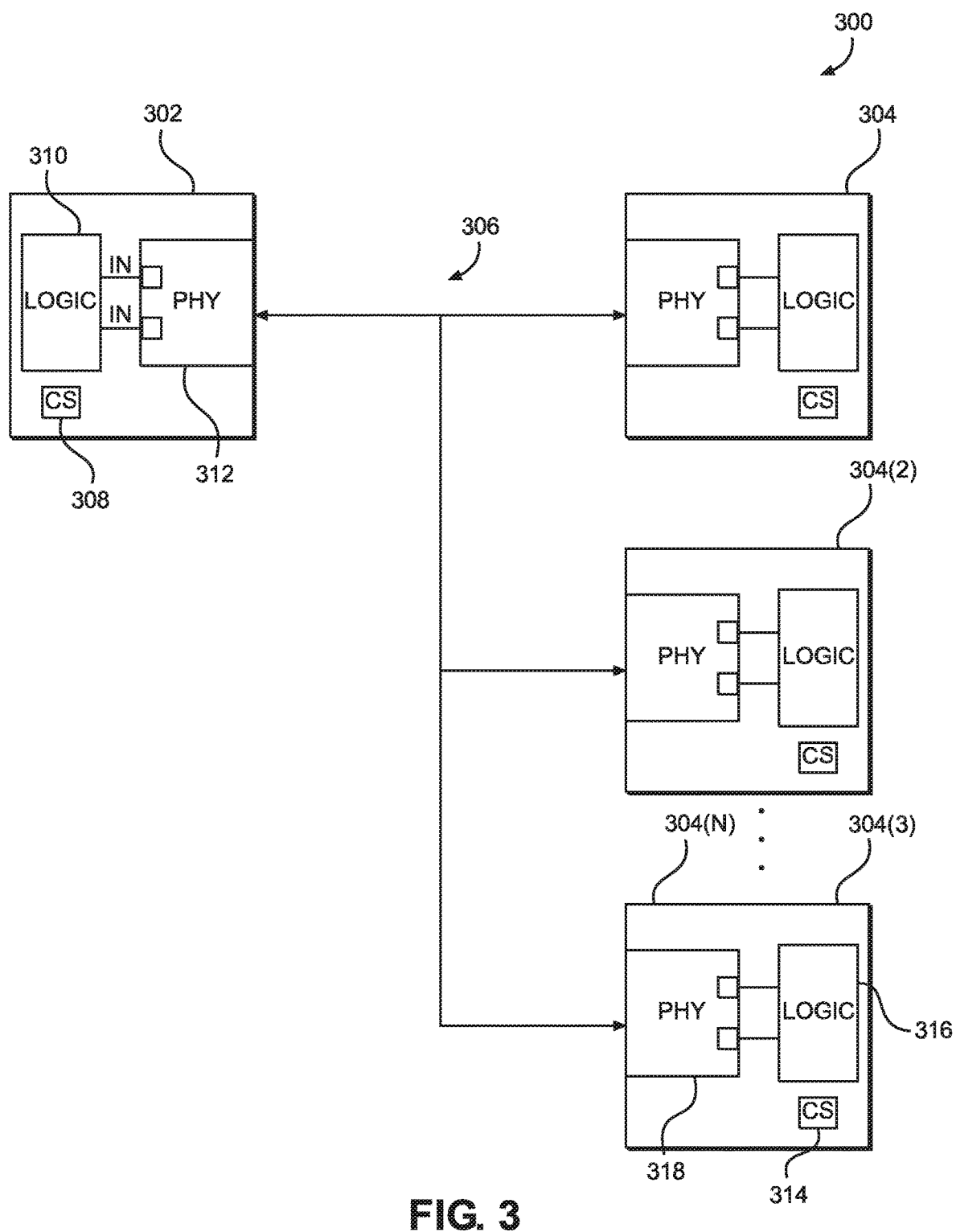
FIG. 3 is a block diagram of a multi-drop time division multiplex (TDM) communication bus connecting a plurality of ICs and allowing bidirectional VGI communication therebetween according to an exemplary aspect of the present disclosure.

FIG. 3 illustrates a computing system 300 having a multi-drop TDM bus coupling multiple ICs. In particular, the computing system 300 includes a first IC 302 coupled to multiple slave ICs 304(1)-304(N), where as illustrated N=3. The first IC 302 is substantially similar to the first IC 202 of FIG. 2 and operates as a master for a TDM bus 306. Likewise, the slave ICs 304(1)-304(N) are similar to the second IC 204. Thus, the first IC 302 includes a control system 308 and a logic element 310 that sends and/or receives GPIO signals from a TDM bus PHY 312. The TDM bus PHY 312 converts GPIO OUT by placing them into channels within a TDM stream for transmission over the TDM bus 306. The TDM bus PHY 312 also extracts GPIO IN signals that are within channels on the TDM bus 306. The GPIO IN signals are passed to the logic element 310. Again, while not explicitly illustrated, the TDM bus PHY 312 includes necessary and sufficient structure to act as a transceiver to send and receive signals over the TDM bus 306 and may be referred to as a bus interface.

With continued reference to FIG. 3, a slave IC 304(N) includes a control system 314 and a logic element 316 that sends and/or receives GPIO signals from a TDM bus PHY 318. The TDM bus PHY 318 converts GPIO OUT signals by placing them into channels within a TDM stream for transmission over the TDM bus 306. The TDM bus PHY 318 also extracts GPIO IN signals that are within channels on the TDM bus 306. The GPIO IN signals are passed to the logic element 316. The other slave ICs 304(1)-304(N-1) have similar elements and further discussion is omitted.

While the TDM bus 306 may be any multi-drop TDM bus, it should be appreciated that sometimes audio buses are underutilized and have ready bandwidth with which to accommodate GPIO signals without affecting audio quality or other performance metrics. While audio buses are specifically contemplated as being suitable for carrying the VGI signals described herein, it should be appreciated that the SOUNDWIRE protocol and the SLIMbus protocol, both promulgated by the MIPI Alliance, are specific examples of appropriate multi-drop audio TDM buses suitable for use with the present disclosure.

Figure 4:
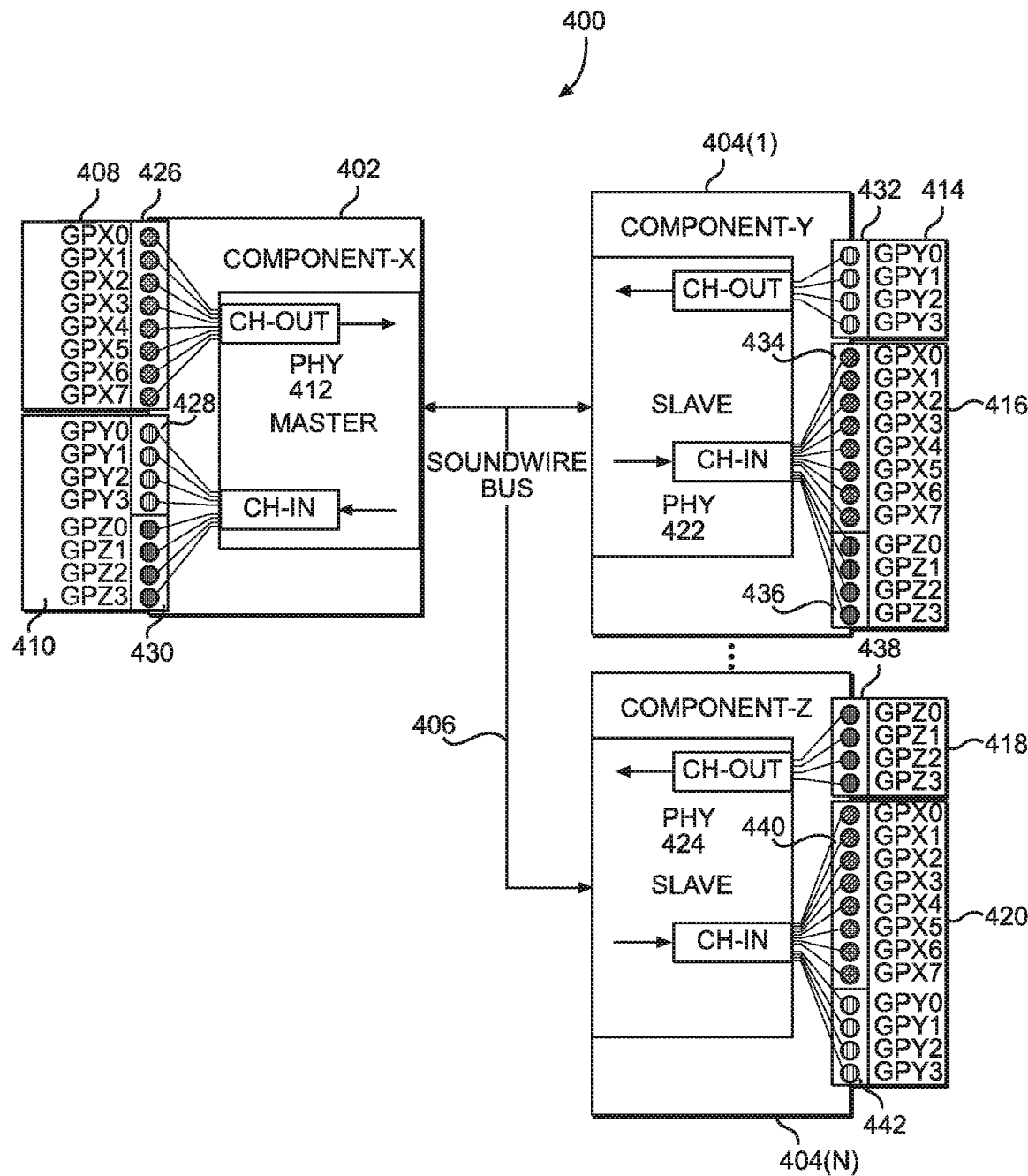
FIG. 4 is a simplified diagram illustrating how a plurality of GPIO signals may be transmitted across a multi-drop communication bus.

In this regard, FIG. 4 illustrates a computing system 400 having a first master IC 402 coupled to a plurality of slave ICs 404(1)-404(N) through a SOUNDWIRE bus 406. As illustrated, the first master IC 402 has a logic element 408 that generates GPIO output signals GPx0-GPx7 and a logic element 410 that receives GPIO input signals GPy0-GPy3 and GPz0-GPz3. Note that the logic elements 408 and 410 may be the same logic element. In operation, the logic element 408 passes the GPIO signals GPx0-GPx7 to a PHY 412 that places them in an appropriate TDM slot for transmission on the SOUNDWIRE bus 406. Likewise, slave IC 404(1) has a logic element 414 that generates the GPIO signals GPy0-GPy3 and a logic element 416 that receives the GPIO signals GPx0-GPx7 and GPz0-GPz3. Note that the logic elements 414 and 416 may be the same logic element. Similarly, slave IC 404(N) has a logic element 418 that generates the GPIO signals GPz0-GPz3 and a logic element 420 that receives the GPIO signals GPx0-GPx7 and GPy0-GPy3. Note that the logic elements 418 and 420 may be the same logic element. The slave IC 404(1) has a PHY 422 that sends the GPIO signals GPy0-GPy3 in slots over the SOUNDWIRE bus 406 and extracts the GPIO signals GPx0-GPx7 and GPz0-GPz3 from slots in the SOUNDWIRE bus 406. Similarly, the slave IC 404(N) has a PHY 424 that sends the GPIO signals GPz0-GPz3 in slots over the SOUNDWIRE bus 406 and extracts the GPIO signals GPx0-GPx7 and GPy0-GPy3 from slots in the SOUNDWIRE bus 406. Note that the logic elements 408, 410, 414, 416, 418, and 420 may include registers 426, 428, 430, 432, 434, 436, 438, 440, and 442 that hold the GPIO signals as needed or desired.

While FIG. 4 illustrates a comprehensive GPIO transport solution that allows all devices to see all GPIO signals, the present disclosure is not so limited. In an alternate aspect, only a subset of devices may receive specific GPIO signals. For example, GPx0-GPx7 driven from the first master IC 402 may be addressed to the slave IC 404(1) but not the slave IC 404(N) and thus are not read from the SOUNDWIRE bus 406 by the slave IC 404(N). Likewise, it is possible that only a portion of a specific set of GPIO signals is received at a destination. For example, GPx0-GPx3 (but not GPx4-GPx7) may be received by the slave IC 404(N) and GPx4-GPx7 are received by the slave IC 404(1) (but not GPx0-GPx3).

Figure 5:
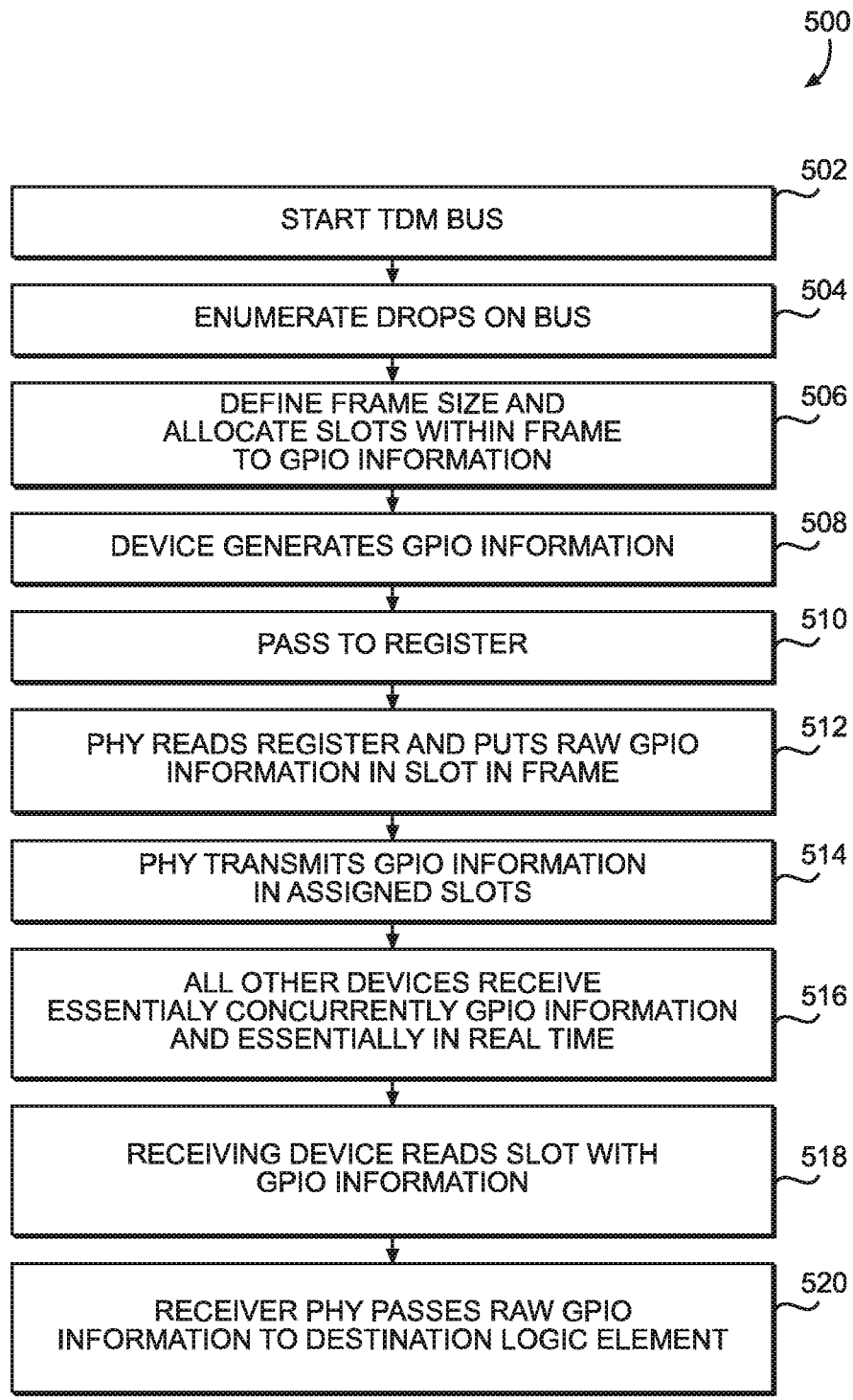
FIG. 5 is a flowchart illustrating an exemplary process for using a multi-drop TDM bus to transmit VGI signals with low latency.

FIG. 5 provides a flowchart of the computing system 400 in operation. As such, the process assumes that the bus 406 is a SOUNDWIRE bus and that SOUNDWIRE protocols are used to send and receive frames as set forth in the process. In this regard, a process 500 begins with the start of the TDM bus (e.g., the TDM bus 306 of FIG. 3 or the SOUNDWIRE bus 406 of FIG. 4) (block 502). The "start" may be on power up or other event after manufacture. The master enumerates the drops on the bus (block 504). The master defines a frame size and allocates slots within the frame to GPIO information (block 506). Note, as better explained below, the allocation of slots may try to optimize placement of the slots within the frame in slots that are unsuitable for use as an audio channel. Note further that the slot assignments may define the data width, reflecting a number of GPIO slots per channel, any data offset, reflecting a position in the frame, and a data sample interval, reflecting a maximum latency for real time updates. After enumeration and slot assignment, a device may generate GPIO information (block 508) and pass this GPIO information to an associated register (block 510). The PHY reads the register and puts the raw GPIO information into the appropriate slot in the frame (block 512). As used herein, raw GPIO is defined to be without any additional overhead. Thus, the original GPIO interface bus will appear after short latency on all the corresponding GPIO internal signals. Where relevant, the present disclosure uses "GPIO" for all signals while VGIO is used for internal signals received and delivered from inside the core versus the legacy GPIO interface.

With continued reference to FIG. 5, the PHY then transmits the GPIO information in the assigned slots (block 514). All other devices on the bus receive the GPIO information essentially concurrently and essentially in real time (block 516). Essentially in this case means that minor variations caused by different travel times (e.g., device A is further from device B than device C, so device C receives the information before device B, but both receive the GPIO information essentially concurrently (within picoseconds of each other). In practice, the devices may accumulate data being received on each of the GPIO channels and hold the data until the end of a frame. At the end of the frame, the accumulated data is released to logic within the device. This release also occurs at essentially the same time. As used herein, the delay of a single frame, such as through this accumulation and release, is considered to be short enough to be essentially real time. The receiving device reads the slot with the GPIO information (block 518) and extracts the raw GPIO information. The receiver PHY then passes the raw GPIO information to a destination logic element (block 520).

The ability for the GPIO information to be shared amongst multiple devices in essentially real time as if a physical GPIO link was connecting them but without incurring the extra GPIO pin penalty improves performance and allows for continued size reduction of ICs. Likewise, this arrangement allows slave-to-slave communication, master-to-slave communication, slave-to-master communication, point-to-point, and point-to-many options. Likewise, by using the TDM slots assigned by the master, there is no need to add source or addressing information or add overhead with routing instructions.

Figure 6:
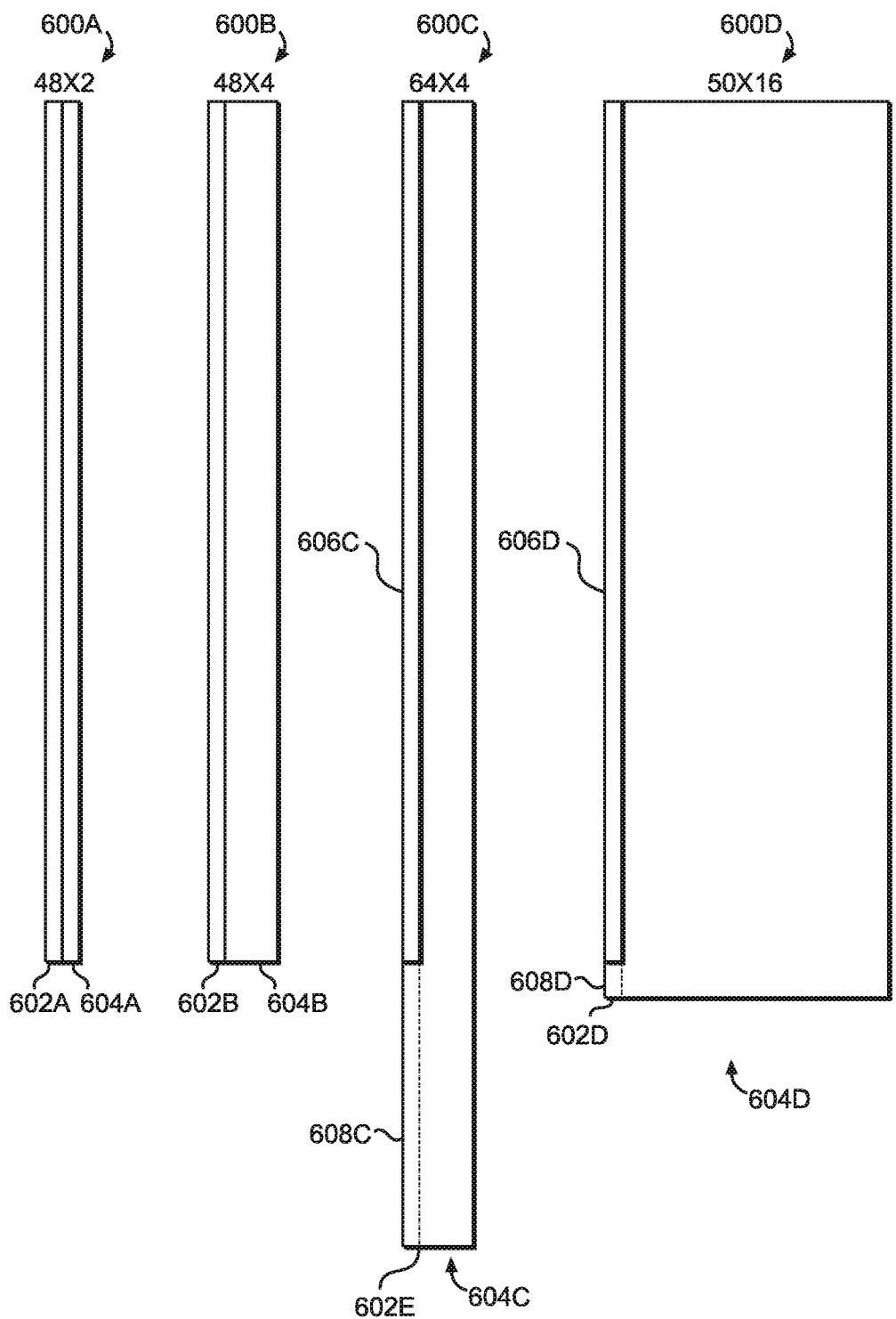
FIG. 6 is a simplified diagram of a variety of frames that can be used on a multi-drop communication bus.

As noted above, aspects of the present disclosure are well suited for use with a SOUNDWIRE bus such as the SOUNDWIRE bus 406 of FIG. 4. SOUNDWIRE provides for a number of different frame sizes, and while any frame size can accommodate the TDM slots containing GPIO signals, a few frames are illustrated in FIG. 6 showing how the VGI TDM slots may be optimized. In this regard, FIG. 6 illustrates frames 600A-600D. Frame 600A is forty-eight rows by two columns 602A and 604A. In the SOUNDWIRE specification, control information occupies the first forty-eight rows of the first column 602A and the data channels (i.e., payload) go in the remaining rows of the second column 604A. Given that all channels are in a single column, there is little that can be done to optimize the frame 600A by placing a TDM slot having VGI data in a particular spot. Somewhat similarly, frame 600B is forty-eight rows by four columns. The first column 602B is again taken up by control information, leaving the columns 604B available for payload. Again, there is no specific placement of the TDM slots having the VGI channel in the frame 600B that provides an advantage over another location. In contrast, frame 600C is sixty-four rows by four columns. The first column 602C has a first segment 606C of forty-eight rows occupied by control information and a second segment 608C of sixteen rows that are not occupied by control information, but may be too few rows to accommodate audio data. Accordingly, the second segment 608C of sixteen rows in the first column 602C is well suited for placement of the TDM slots having the VGI channel, leaving the columns 604C free for audio channel TDM slots. Likewise, frame 600D has fifty rows by sixteen columns. The first column 602D has a first segment 606D of forty-eight rows taken by control information, leaving a second segment 608D of just two rows. These two rows of the second segment 608D are too few to handle an audio channel TDM slot, but may advantageously be used for the TDM slots having the VGI channel, leaving the columns 604D free for audio channel TDM slots.

Figure 7:
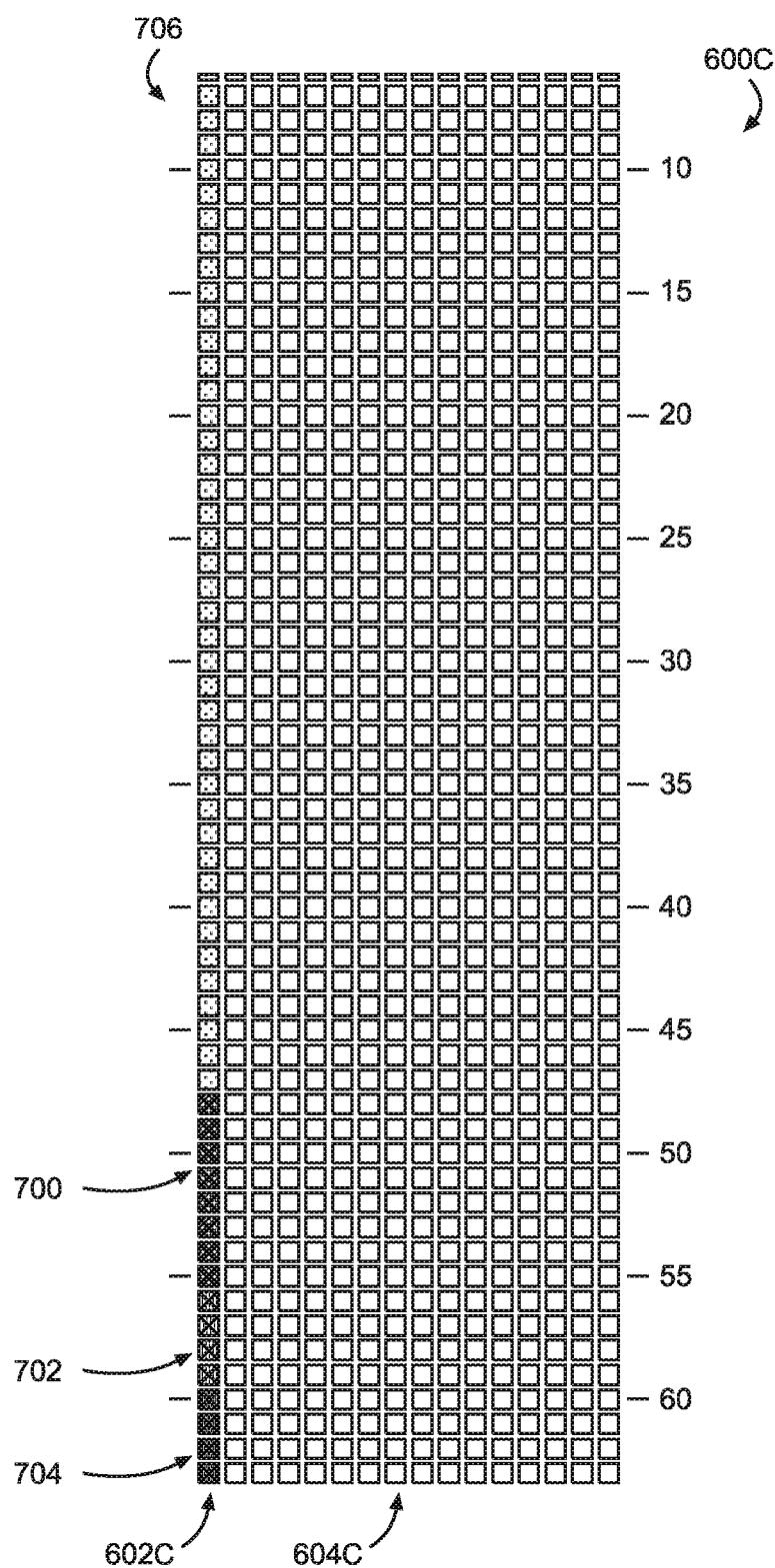
FIG. 7 is a simplified diagram of a TDM frame with the VGI signals inserted into TDM slots without interfering with other slots in the TDM frame.

FIG. 7 provides a more granular view of the frame 600C. Specifically, continuing the example from FIG. 4, a channel 700 is formed of eight slots that hold the GPIO signals GPx0-GPx7, a second channel 702 is formed of four slots that hold the GPIO signals GPy0-GPy3, and a third channel 704 is formed of four slots that hold the GPIO signals GPz0-GPz3. All three channels 700, 702, and 704 are advantageously placed in the same column 602C that holds a control channel 706.

The systems and methods for providing VGI over a TDM bus according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 8:
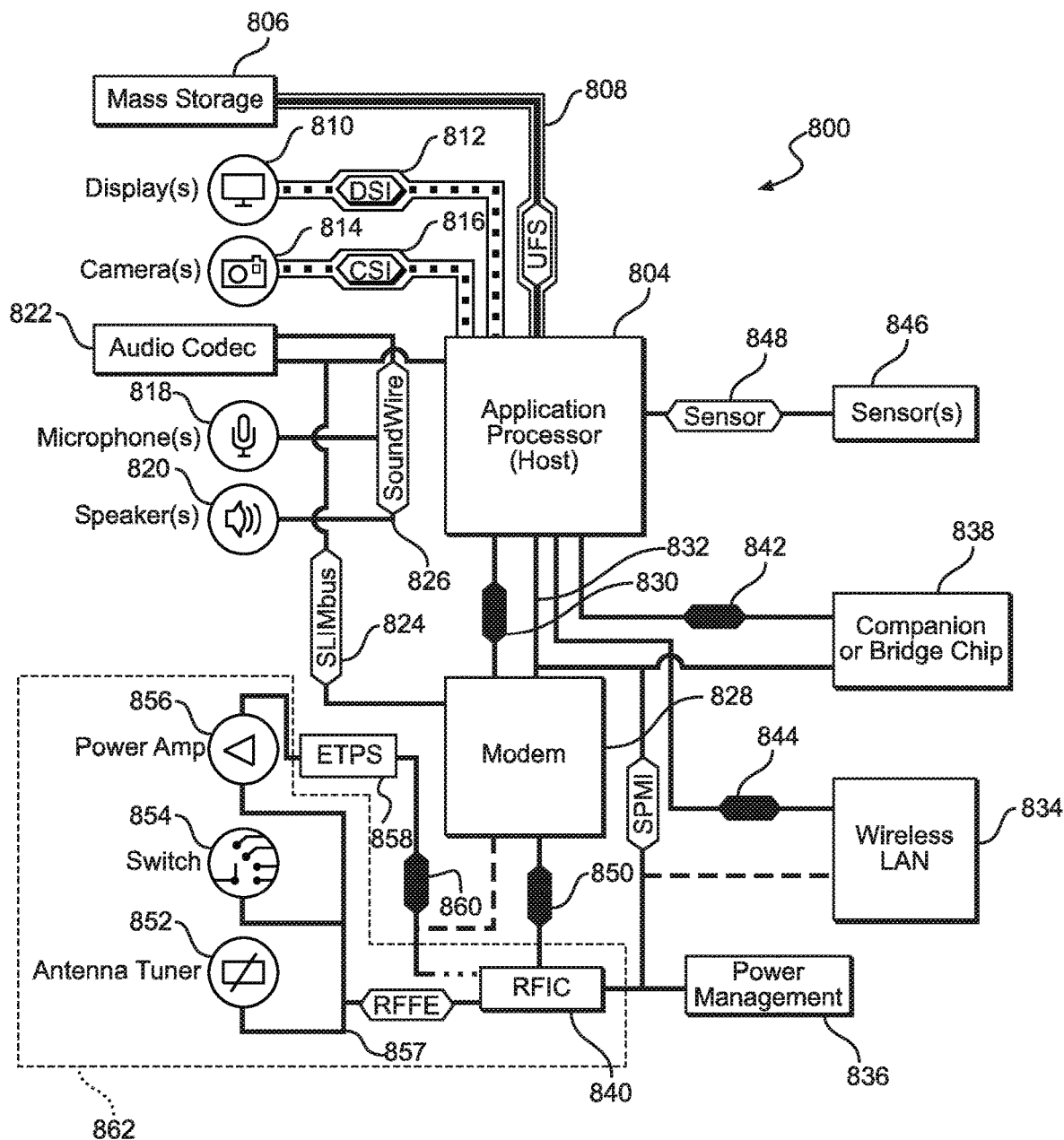
FIG. 8 is a block diagram of an exemplary processor-based system that can include the multi-drop TDM communication bus of FIG. 3.

In this regard, FIG. 8 is a system-level block diagram of an exemplary mobile terminal 800 such as a smart phone, mobile computing device tablet, or the like. While a mobile terminal having a SOUNDWIRE bus is particularly contemplated as being capable of benefiting from exemplary aspects of the present disclosure, it should be appreciated that the present disclosure is not so limited and may be useful in any system having a TDM bus.

With continued reference to FIG. 8, the mobile terminal 800 includes an application processor 804 (sometimes referred to as a host) that communicates with a mass storage element 806 through a universal flash storage (UFS) bus 808. The application processor 804 may further be connected to a display 810 through a display serial interface (DSI) bus 812 and a camera 814 through a camera serial interface (CSI) bus 816. Various audio elements such as a microphone 818, a speaker 820, and an audio codec 822 may be coupled to the application processor 804 through a serial low power interchip multimedia bus (SLIMbus) 824. Additionally, the audio elements may communicate with each other through a SOUNDWIRE™ bus 826. A modem 828 may also be coupled to the SLIMbus 824 and/or the SOUNDWIRE bus 826. The modem 828 may further be connected to the application processor 804 through a peripheral component interconnect (PCI) or PCI express (PCIe) bus 830 and/or a system power management interface (SPMI) bus 832.

With continued reference to FIG. 8, the SPMI bus 832 may also be coupled to a local area network (WLAN) IC (WLAN IC) 834, a power management integrated circuit (PMIC) 836, a companion IC (sometimes referred to as a bridge chip) 838, and a radio frequency IC (RFIC) 840. It should be appreciated that separate PCI buses 842 and 844 may also couple the application processor 804 to the companion IC 838 and the WLAN IC 834. The application processor 804 may further be connected to sensors 846 through a sensor bus 848. The modem 828 and the RFIC 840 may communicate using a bus 850.

With continued reference to FIG. 8, the RFIC 840 may couple to one or more RFFE elements, such as an antenna tuner 852, a switch 854, and a power amplifier 856 through a radio frequency front end (RFFE) bus 857. Additionally, the RFIC 840 may couple to an envelope tracking power supply (ETPS) 858 through a bus 860, and the ETPS 858 may communicate with the power amplifier 856. Collectively, the RFFE elements, including the RFIC 840, may be considered an RFFE system 862. It should be appreciated that the RFFE bus 857 may be formed from a clock line and a data line (not illustrated).

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An integrated circuit (IC) comprising:
    a bus interface configured to couple to a time division multiplex (TDM) bus;
    a transceiver coupled to the bus interface and configured to send signals and receive signals over the TDM bus through the bus interface;
    a logic element coupled to the transceiver and providing to the transceiver at least one general purpose input/output (GPIO) signal; and
    a control system configured to:
        cause the transceiver to send the at least one GPIO signal in a first TDM slot over the TDM bus.

2. The IC of claim 1, wherein the control system is further configured to cause the transceiver to extract a received GPIO signal from a second TDM slot.

3. The IC of claim 1, further comprising a register positioned between the logic element and the transceiver, the register configured to hold the at least one GPIO signal.

4. The IC of claim 1, wherein the bus interface comprises an audio bus interface.

5. The IC of claim 4, wherein the audio bus interface comprises a SLIMbus bus interface.

6. The IC of claim 4, wherein the audio bus interface comprises a SOUNDWIRE bus interface.

7. The IC of claim 1, wherein the first TDM slot is within a frame.

8. The IC of claim 7, wherein the frame comprises a first number of rows and a second number of columns.

9. The IC of claim 8, wherein a first segment of a first column is configured to carry control information.

10. The IC of claim 9, wherein a second segment of the first column is configured to contain the first TDM slot with the at least one GPIO signal.

11. The IC of claim 7, wherein the first TDM slot is configured to be positioned within the frame in a space unsuitable for an audio channel TDM slot.

12. The IC of claim 1, wherein the IC is configured to operate as a master for the TDM bus.

13. The IC of claim 12, wherein the control system is configured to assign the first TDM slot within a TDM frame.

14. An integrated circuit (IC) comprising:
    a bus interface configured to couple to a time division multiplex (TDM) bus;
    a transceiver coupled to the bus interface and configured to send signals and receive signals over the TDM bus through the bus interface;
    a logic element coupled to the transceiver and receiving from the transceiver at least one general purpose input/output (GPIO) signal; and
    a control system configured to:
        cause the transceiver to receive the at least one GPIO signal in a first TDM slot over the TDM bus.

15. A method of sending a general purpose input/output (GPIO) signal over a bus, the method comprising:
    placing a raw GPIO signal within a time division multiplex (TDM) slot in a TDM frame; and
    sending from a first integrated circuit (IC) the TDM frame over a TDM bus to a second IC.

16. The method of claim 15, further comprising generating the raw GPIO signal in a logic element within the first IC.

17. The method of claim 16, further comprising passing the raw GPIO signal from the logic element to a register.

18. The method of claim 17, further comprising reading the register for transmission over the TDM bus.

19. The method of claim 15, wherein sending over the TDM bus comprises sending over an audio TDM bus.

20. The method of claim 19, wherein sending over the audio TDM bus comprises sending over a SOUNDWIRE bus.

21. The method of claim 15, wherein placing the raw GPIO signal in the TDM frame comprises placing the raw GPIO signal in a column of the TDM frame with control signals.

22. The method of claim 15, wherein placing the raw GPIO signal in the TDM frame comprises placing the raw GPIO signal in a location within the TDM frame unsuitable for an audio channel slot.

23. The method of claim 15, further comprising receiving a second GPIO signal in the TDM slot over the TDM bus.

24. A method of receiving a general purpose input/output (GPIO) signal over a bus, the method comprising:
    receiving at a first integrated circuit (IC) a time division multiplexed (TDM) signal comprising one or more TDM slots; and
    extracting from one of the one or more TDM slots a raw GPIO signal.

* * * * *